United States Patent
Lohmar et al.

(10) Patent No.: US 9,706,523 B2
(45) Date of Patent: Jul. 11, 2017

(54) METHOD, BROADCAST CONTROL DEVICE, COMPUTER PROGRAM AND COMPUTER PROGRAM PRODUCT FOR CONTROLLING BROADCAST TRANSMISSIONS

(71) Applicant: Telefonaktiebolaget L M Ericsson (publ), Stockholm (SE)

(72) Inventors: Thorsten Lohmar, Aachen (DE); Michael John Slssingar, Skärholmen (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 74 days.

(21) Appl. No.: 14/437,219

(22) PCT Filed: Oct. 25, 2012

(86) PCT No.: PCT/SE2012/051152
§ 371 (c)(1),
(2) Date: Apr. 21, 2015

(87) PCT Pub. No.: WO2014/065727
PCT Pub. Date: May 1, 2014

(65) Prior Publication Data
US 2015/0289232 A1    Oct. 8, 2015

(51) Int. Cl.
*H04W 4/00* (2009.01)
*H04W 72/00* (2009.01)
(Continued)

(52) U.S. Cl.
CPC ....... *H04W 72/005* (2013.01); *H04L 12/1845* (2013.01); *H04L 12/1859* (2013.01);
(Continued)

(58) Field of Classification Search
CPC .............................. H04W 68/02; H04W 24/00
(Continued)

(56) References Cited

U.S. PATENT DOCUMENTS

| | | | |
|---|---|---|---|
| 2012/0093054 A1 | 4/2012 | Liu et al. | |
| 2013/0021933 A1* | 1/2013 | Kovvali | H04W 28/0236 370/252 |

FOREIGN PATENT DOCUMENTS

| | | | | |
|---|---|---|---|---|
| GB | WO 2007123577 A1 * | 11/2007 | ............ | G06Q 30/04 |
| WO | WO 2007/123577 | 11/2007 | | |

OTHER PUBLICATIONS

International Search Report for International application No. PCT/SE2012/051152, Aug. 2, 2013.
(Continued)

*Primary Examiner* — Iqbal Zaidi
(74) *Attorney, Agent, or Firm* — Patent Portfolio Builders, PLLC

(57) ABSTRACT

It is presented a method, performed in a broadcast control device (1), for controlling broadcast transmissions in a cellular communication system (8) to wireless devices (2). The method comprises the steps of: obtaining (30) a transmission policy associated with a content provider (6), the transmission policy comprising a restriction to only broadcast a content feed to a geographically limited area; and blocking (32) any content feeds from the content provider (6) violating the transmission policy associated with the content provider (6). A corresponding broadcast control device (1), system, computer program and computer program product are also presented.

10 Claims, 2 Drawing Sheets

(51) Int. Cl.
| | |
|---|---|
| *H04L 12/18* | (2006.01) |
| *H04W 4/02* | (2009.01) |
| *H04W 4/06* | (2009.01) |
| *H04L 12/813* | (2013.01) |
| *H04N 21/61* | (2011.01) |
| *H04N 21/6405* | (2011.01) |
| *H04L 12/851* | (2013.01) |
| *H04L 12/823* | (2013.01) |
| *H04L 12/24* | (2006.01) |
| *H04W 72/04* | (2009.01) |
| *H04W 84/04* | (2009.01) |

(52) U.S. Cl.
CPC ......... *H04L 47/20* (2013.01); *H04N 21/6156* (2013.01); *H04N 21/6405* (2013.01); *H04W 4/021* (2013.01); *H04W 4/06* (2013.01); *H04L 12/189* (2013.01); *H04L 41/0893* (2013.01); *H04L 47/2425* (2013.01); *H04L 47/32* (2013.01); *H04W 72/0493* (2013.01); *H04W 84/042* (2013.01)

(58) Field of Classification Search
USPC ......... 370/252–311, 328–339; 455/458, 343, 455/374
See application file for complete search history.

(56) References Cited

OTHER PUBLICATIONS

Mobile Broadcast Services Requirements; Candidate Version 1.1—Sep. 14, 2010; Open Mobile Alliance; OMA-RD-BCAST-V1_1-20100914-C.
PCT Written Opinion of the International Searching Authority for International application No. PCT/SE2012/051152, Aug. 7, 2013.
3GPP TS 33.246 V12.1.0 (Sep. 2014) 3rd Generation Partnership Project; Technical Specification Group Services and System Aspects; 3G Security; Security of Multimedia Broadcast/Multicast Service (MBMS) (Release 12), 2014.

\* cited by examiner

METHOD, BROADCAST CONTROL DEVICE, COMPUTER PROGRAM AND COMPUTER PROGRAM PRODUCT FOR CONTROLLING BROADCAST TRANSMISSIONS

PRIORITY

This nonprovisional application is a U.S. National Stage Filing under 35 U.S.C. §371 of International Patent Application Serial No. PCT/SE2012/051152, filed Oct. 25, 2012, and entitled "Method, Broadcast Control Device, Computer Program and Computer Program Product for Controlling Broadcast Transmissions."

TECHNICAL FIELD

The invention relates to controlling broadcast transmissions in a cellular communication system.

BACKGROUND

Cellular communication systems have become commonplace and are used by a large majority of people for person to person communication. Moreover, with the increasing use of smartphones, digitally distributed content is increasingly consumed on wireless devices. While a large part of such content, e.g. web content, needs to be directly controllable by the user, media content such as video can in many cases be shared by several users.

In order to increase efficiency shared media consumption, point-to-multipoint systems such as broadcasting can be used. In this way, network resources are shared between receiving wireless devices to a higher degree. One standard for broadcasting using cellular communication systems is 3GPP MBMS ($3^{rd}$ Generation Partnership Project-Multimedia Broadcast Multicast Service).

However, the broadcast systems according to the prior art are rigid in many ways in how content is provided.

SUMMARY

It is an object to improve flexibility when providing broadcast services from operators of cellular communication systems to content providers.

According to a first aspect, it is presented a method, performed in a broadcast control device, for controlling broadcast transmissions in a cellular communication system to wireless devices. The method comprises the steps of: obtaining a transmission policy associated with a content provider, the transmission policy comprising a restriction to only broadcast a content feed to a geographically limited area; and blocking any content feeds from the content provider violating the transmission policy associated with the content provider. Using this method, content providers can conveniently be trusted to configure a suitable geographic area for their content feed in a transmission policy. The broadcast control device enforces the transmission policy. In this way, the content providers can be trusted to configure the transmission policies even when an operator (separate from the content provider) owns the cellular communication system.

In the step of obtaining a transmission policy, the transmission policy may further comprise a time restriction. For example, this could involve a time of day, on particular days of the week, for a one-off time period of x minutes, etc. This allows the content providers to select a suitable time period for the transmission.

In the step of obtaining a transmission policy, the transmission policy may further comprise a bandwidth restriction. In this way, the content provider may reserve only as much bandwidth deemed necessary. Since this is, again, enforced by the broadcast control device, control of the transmission policy can be left to the content provider.

In the step of obtaining a transmission policy, the transmission policy may further comprise a radio access system type restriction, such as either or both of W-CDMA and LTE. This allows a the content provider to further tailor the transmission policy according to the needs of the content provider.

The cellular communication system may comply with the specifications for Multimedia Broadcast Multicast Services release 6 or later, as defined by 3rd Generation Partnership Project.

According to a second aspect, it is presented a broadcast control device arranged to control broadcast transmissions in a cellular communication system to wireless devices. The broadcast control device comprises: a processor; and a computer program product storing instructions. The instructions, when executed by the processor, causes the broadcast control device to: obtain a transmission policy associated with a content provider, the transmission policy comprising a restriction to only broadcast a content feed to a geographically limited area; and block any content feeds from the content provider violating the transmission policy associated with the content provider.

The transmission policy may further comprise a time restriction.

The transmission policy may further comprise a bandwidth restriction.

The transmission policy may further comprise a radio access system type restriction.

The broadcast control device may be arranged to be connected to a single Broadcast Multicast Service Centre.

According to a third aspect, it is presented a broadcast control system comprising a plurality of broadcast control devices according to the second aspect, wherein each broadcast control device is responsible for its own geographically limited area.

The broadcast control system may further comprise a provisioning device, the provisioning device providing an interface to allow content providers to configure its transmission policies for use by the broadcast control devices.

According to a fourth aspect, it is presented a computer program for controlling broadcast transmissions in a cellular communication system to wireless devices. The computer program comprises computer program code which, when run on a broadcast control device, causes the broadcast control device to: obtain a transmission policy associated with a content provider, the transmission policy comprising a restriction to only broadcast a content feed to a geographically limited area; and block any content feeds from the content provider violating the transmission policy associated with the content provider.

According to a fifth aspect, it is presented a computer program product comprising a computer program according to the fourth aspect and a computer readable means on which the computer program is stored.

The term broadcast used in the description and the claims is to be construed as any point to multipoint communication, including strict broadcast, multicast, etc.

The term bandwidth used in the description and the claims is to be construed as a measurement relating, directly or indirectly, to a data transfer rate.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
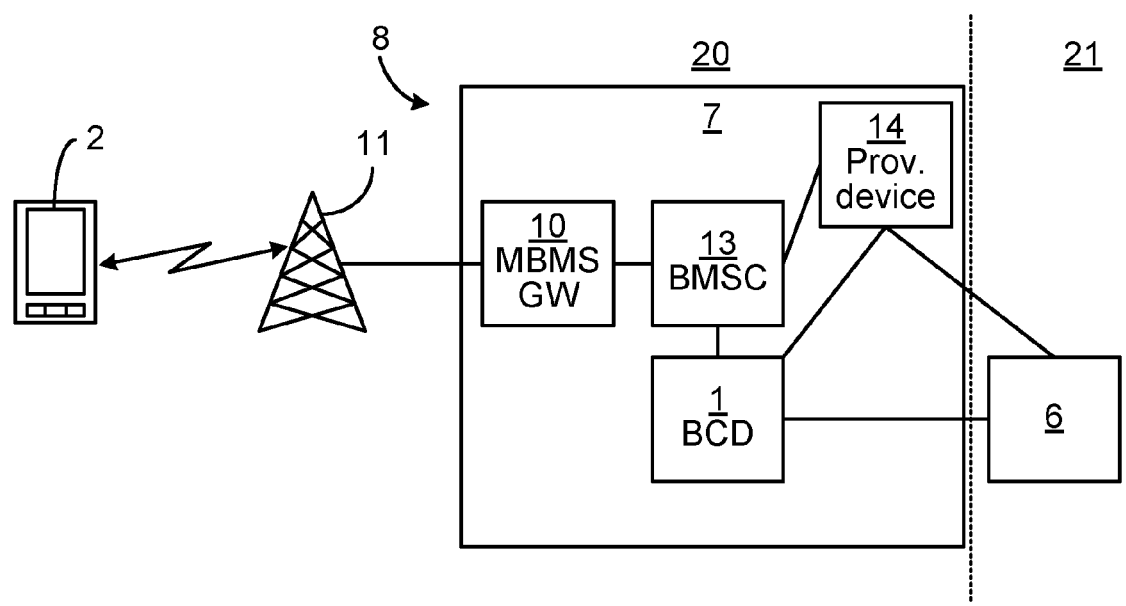
FIG. 1 is a schematic diagram illustrating an environment in which embodiments of the present invention can be applied.

FIG. 1 is a schematic diagram illustrating a cellular communication system 8 where embodiments presented herein may be applied. The cellular communication system 8 comprises one or more radio base stations 11, here in the form of evolved Node Bs, also known as eNode Bs or eNBs. The radio base stations 11 could also be in the form of Node Bs, BTSs (Base Transceiver Stations) and/or BSSs (Base Station Subsystems), etc. The radio base stations 11 provide radio connectivity to a plurality of mobile or fixed wireless terminals 2. The wireless terminals 2 shown here are capable of receiving a broadcast content feed. The term wireless terminal is also known as mobile communication terminal, user equipment, mobile terminal, user terminal, user agent, machine-to-machine device etc., and can be, for example, what today are commonly known as a mobile phone or a tablet/laptop with wireless connectivity or fixed mounted terminal.

The cellular communication system 8 may e.g. comply with any one or a combination of LTE-SAE (Long Term Evolution-System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

The cellular communication system 8 further here comprises a broadcast control system 7. The broadcast control system provides an ability to broadcast content, in a multicast way, i.e. multiple wireless terminals 2 can receive the same content in a point-to-multipoint fashion. This increases network efficiency, e.g. compared to point-to-point streaming, also known as unicast (as opposed to broadcast).

The broadcast control system can comply with any suitable standard, e.g. 3GPP MBMS (3rd Generation Partnership Project Multimedia Broadcast Multicast Service), 3GPP MBMS Evolution, 3GPP IMB (Integrated Mobile Broadcast), 3GPP E-MBMS (Evolved MBMS), DVB-H (Digital Video Broadcasting-Handheld), DVB-NGH (Digital Video Broadcasting-Next Generation Handheld), or any other current or future broadcast system over wireless networks, as long as the principles described hereinafter are applicable. In this document, embodiments are presented as applied in 3GPP MBMS release 6 or later, but it is to be understood that this does not imply that any other standard is excluded.

The broadcast control system 7 here comprises an MBMS Gateway (MBMS GW) 10, a Broadcast Multicast Service Center (BMSC) 12, a Broadcast Control Device (BCD) 1 and a provisioning device 14. Other components not required to present the embodiments presented herein are omitted for reasons of clarity.

One or more content providers 6 are also connected to the broadcast control system 7. In this way, the wireless terminal 2 can receive broadcast content from the broadcast control system 7, originated from the content providers 6. The content providers 6 are part of a content provider domain 21 while the cellular communication system 8 is part of an operator domain 20. The content which is broadcast from the content providers 6 can e.g. comprise video content and/or audio content.

The BMSC 12 is responsible for the general flow of content from the content providers 6 to the wireless terminals 2. The MBMS-GW 10 is the component of the broadcast control system 7 closest to the wireless terminals 2. Moreover, the MBMS-GW is responsible for session management, etc.

The provisioning device 14 provides an interface to the content providers 6 to allow them to configure their transmission policies for use by the broadcast control devices 1. This interface can e.g. be a web interface for operators of the content providers 6 to configure the transmission policies. Alternatively or additionally, the interface of the provisioning device 14 can be an application programming interface (API) to allow remote configuration by one or more devices of the content providers 6 in direct communication with the provisioning device 14. The transmission policies are subsequently enforced by the BCD 1, which is explained in more detail below. The content providers 6 can in this way define their own transmission policy, optionally associated with a cost reflecting the transmission policy. The transmission policy at least contains a restriction with regard to geographical area. Moreover, restrictions on time and/or bandwidth can optionally be configured.

The interface of the provisioning device 14 is provided with appropriate security, e.g. for authentication and authorisation. Content providers 6 have independent access to the provisioning device 14, and can be configured to receive no information relating to other content providers 6. In this way, several content providers 6 can configure respective transmission policies tailored to the needs of the particular content provider 6, e.g. in geographical area, time, bandwidth, radio access system type (e.g. W-CDMA or LTE), and/or an indication of frequency layer or cell layer.

For frequency layers, it may happen, that an operator is using multiple different carriers for its LTE (or other access technology) offering. The idea here is that the transmission policy can include a restriction to only allow broadcast transmission on a certain carrier e.g. band 1 and band 3. An operator may have the internal policy to allow broadcast only on some bands. For cell layers, this relates to a heterogeneous cell topology, where operators are use different cell sizes, such as macro and pico cells. By including the cell layer in the transmission policy, the operator can e.g. restrict the content provider to broadcast only on the pico layer (e.g. covering a shopping mall) and not on the macro layer (covering the shopping mall but also a much larger area around).

The content is fed from the content provider 6 via the BCD 1, the BMSC 12, MBMS-GW 10, and radio base station 11 to the wireless terminals 2. In this way, the BCD 1 can enforce the currently valid transmission policy. This is controlled (e.g. by blocking), e.g. when the content feed violates a transmission policy associated with the content provider 6 in question, which will be explained in more detail below. The BCD 1 is here connected to a single BMSC 12.

The broadcast control system 7 can e.g. provide a way to broadcast discrete files or MPEG-DASH (Moving Picture Experts Group-Dynamic Adaptive Streaming over HTTP (Hypertext Transfer Protocol)) content over Flute transport to the wireless devices 2.

In order not to obscure the concepts presented herein, other (sometimes optional) network nodes such as Radio Network Controller, GGSN (Gateway GPRS (general packet radio service) support node), SGSN (serving GPRS support node), are omitted from the cellular communication system 8 of FIG. 1, but may be used as needed during operation.

Figure 2:
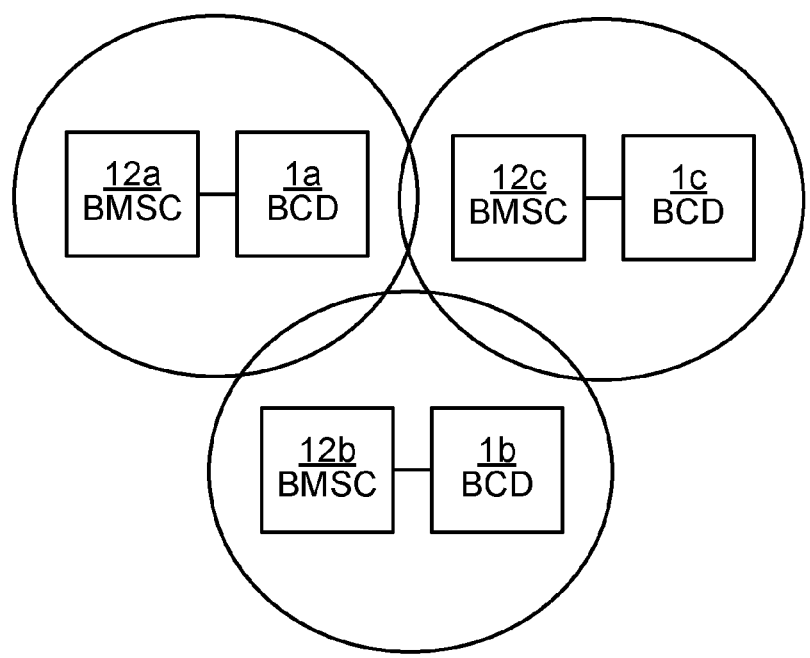
FIG. 2 is a schematic diagram illustrating an embodiment providing a decentralised broadcast control system.

FIG. 2 is a schematic diagram illustrating an embodiment providing a decentralised broadcast control system. In this embodiment, there are several BMSCs 12a-c, each one connected to a respective BCD 1a-c. Each BMSC is associated with a respective geographical area 5a-c. Each geographical area 5a-c can e.g. correspond to a set of one or more radio base stations 11.

Figure 3:
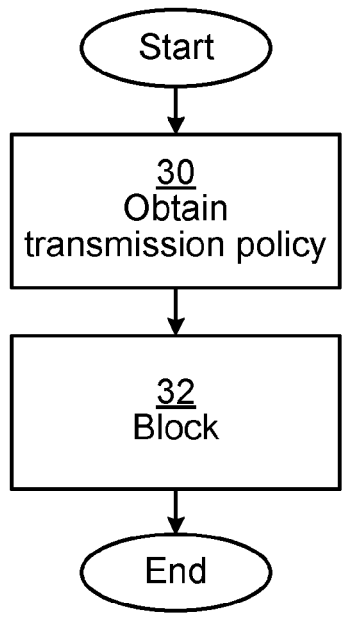
FIG. 3 is a flow chart illustrating a method executed in a broadcast control device of FIGS. 1-2.

FIG. 3 is a flow chart illustrating a method executed in a broadcast control device of FIGS. 1-2. The method controls broadcast transmissions to one or more of the wireless devices.

In an initial obtain step 30, a transmission policy associated with a content provider is obtained. This transmission policy can e.g. be obtained from the provisioning device 14 and comprises a restriction to only broadcast a content feed to a geographically limited area. The geographically limited area can e.g. be one or more of the geographical areas 5a-c shown in FIG. 2. For example, the transmission policy can restrict the broadcast of a content feed to a region of a country, a city or a part of a city, such as a shopping centre. In this way, content of appropriate granularity, e.g. from regional down to highly localised, can be provided to the wireless users.

Optionally, the transmission policy comprises a time restriction, e.g. to only allow the content feed at a particular time of day, on particular days of the week, for a one-off time period of x minutes, etc.

Optionally, the transmission policy comprises a bandwidth restriction. The bandwidth restriction can comprise a direct bitrate restriction e.g. in number of bits per second, such as 100 kilobits per second (kbps) or 1 Megabit per second (Mbps). Alternatively or additionally, the bandwidth restriction can comprise resource restrictions which affect the bitrate, such as a restriction of any one or more of: a number of Flute transport channels, a number of MBMS bearers, bitrate per MBMS bearer, maximum allowable packet loss, and MPEG-DASH segment size, frequency layer, cell layer or any required file delivery.

Optionally, the transmission policy comprises a radio access system type restriction, such as only W-CDMA, only LTE, or both W-CDMA and LTE. In this way, further flexibility is provided for the content provider in defining the transmission policy.

In a block step 32, any content feeds from the content provider which violate the transmission policy associated with the content provider are blocked. For instance, the BCD 1 restricts the content feeds from the content provider to only be forwarded (via the MBMS-GW) to radio base stations within the geographical restriction of the transmission policy.

When there is a time restriction in the transmission policy, content feeds received in compliance with the time restriction are simply forwarded for broadcast, while content feeds received at a time which violates the time restriction are discarded. Optionally, a message is sent to the content provider in this case to stop the content feed.

When there is bandwidth restriction in the transmission policy, this may be enforced either by blocking and discarding packets (such as IP (Internet Protocol) packets) of the content feed in excess of the bandwidth restriction, or by blocking the entire content feed if it violates the bandwidth restriction. Optionally, there is a sliding window filter to allow temporary peaks in bandwidth as long as the average bandwidth is within the bandwidth restriction. Optionally, the bandwidth may be exceeded up to a certain amount (relative or absolute) from the bandwidth restriction, subject to a service contract between the operator and the content provider. In one embodiment, the blocking can be effected at provisioning time, by the system rejecting the bearer session start request and sending an appropriate response back to the content provider.

Figure 4:
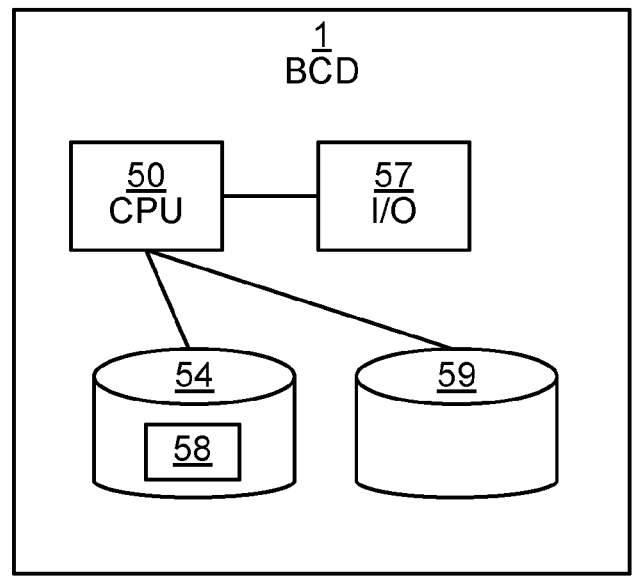
FIG. 4 is a schematic diagram showing some components of the network device arranged to execute the method of Fig **.

FIG. 4 is a schematic diagram showing some components of the broadcast control device 1 arranged to execute the method of FIG. 3. The components shown here can be components shared with a connected device, such as a BMSC 12, or components specifically provided for the broadcast control device 1, separate from any connected devices. A processor 50 is provided using any combination of one or more of a suitable central processing unit (CPU), multiprocessor, microcontroller, digital signal processor (DSP), application specific integrated circuit etc., capable of executing software instructions contained in a computer program 58 stored in a computer program product 54, e.g. in the form of a memory, but not in the form of a signal or any form of electromagnetic wave. The processor 50 can be configured to execute the method described with reference to FIG. 3 above.

The computer program product 54 is here a memory being any combination of read-and-write memory (RAM) and read-only-memory (ROM). The memory also comprises persistent storage, which, for example, can be any single one or combination of magnetic memory, optical memory, solid state memory or even remotely mounted memory. The processor 50 controls the general operation of the broadcast control device 1.

The broadcast control device 1 further comprises a data memory 59, which is a read-and-write memory. The data memory 59 may also comprise persistent storage, which, for example, can be any single one or combination of magnetic memory, optical memory, solid state memory or even remotely mounted memory. Optionally, the computer program product 54 and the data memory 59 can form part of the same memory device.

The broadcast control device 1 further comprises an I/O interface 57 for communicating with external entities, e.g. to receive content feeds and communicate with the provisioning device 14. Other components of the broadcast control device 1 are omitted in order not to obscure the concepts presented herein.

Figure 5:
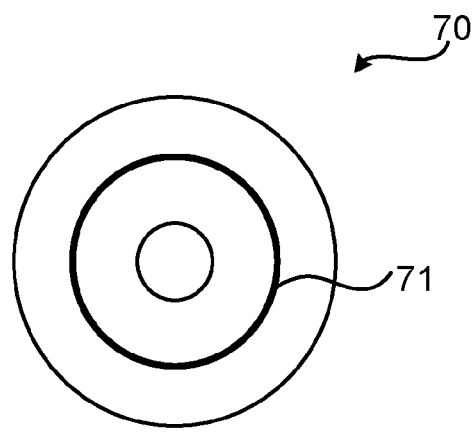
FIG. 5 shows one example of a computer program product comprising computer readable means.

FIG. 5 shows one example of a computer program product 70 comprising computer readable means. On this computer readable means a computer program 71 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as the computer program product 54 of FIG. 4. While the computer program 71 is here schematically shown as a track on the depicted optical disk, the computer program can be stored in any way which is suitable for the computer program product.

Using the embodiments presented herein, the operator of the cellular communication system can better capitalise on its investment by providing a flexible way for content providers to distribute content feeds to the wireless terminals of the cellular communication system.

Moreover, the content providers are given an opportunity to flexibly define the geographical area for the broadcasted content feed. This can be particularly useful for local organisations with a time limited user base, such as sports venues, live music venues, etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, performed in a broadcast control device, for controlling broadcast transmissions in a cellular communication system to wireless devices, the method comprising:

obtaining a transmission policy associated with a content provider, the transmission policy comprising a restriction to only broadcast a content feed to a geographically limited area, wherein the transmission policy further comprises a bandwidth restriction and a time restriction, wherein the bandwidth restriction comprises a restriction to only broadcast the content feed on a particular frequency band; and blocking any content feeds from the content provider violating the transmission policy associated with the content provider.

2. The method according to claim 1, wherein the transmission policy further comprises a radio access system type restriction.

3. The method according to claim 1, wherein the cellular communication system complies with the specifications for Multimedia Broadcast Multicast Services release 6 or later, as defined by 3rd Generation Partnership Project.

4. A broadcast control device arranged to control broadcast transmissions in a cellular communication system to wireless devices, the broadcast control device comprising:

a processor; and a non-transitory memory storing instructions that, when executed by the processor, causes the broadcast control device to:

obtain a transmission policy associated with a content provider, the transmission policy comprising a restriction to only broadcast a content feed to a geographically limited area, wherein the transmission policy further comprises a bandwidth restriction and a time restriction, wherein the bandwidth restriction comprises a restriction to only broadcast the content feed on a particular frequency band; and block any content feeds from the content provider violating the transmission policy associated with the content provider.

5. The broadcast control device according to claim 4, wherein the transmission policy further comprises a radio access system type restriction.

6. The broadcast control device according to claim 4, wherein the broadcast control device is arranged to be connected to a single Broadcast Multicast Service Centre.

7. A broadcast control system comprising a plurality of broadcast control devices according to claim 4, wherein each broadcast control device is dedicated for a particular geographically limited area.

8. The broadcast control system according to claim 7, further comprising a provisioning device, the provisioning device providing an interface to allow content providers to configure transmission policies for use by the broadcast control devices.

9. A computer program for controlling broadcast transmissions in a cellular communication system to wireless devices, the computer program comprising computer program code stored on a non-transitory computer readable medium, the computer program code which, when run on a broadcast control device, causes the broadcast control device to:

obtain a transmission policy associated with a content provider, the transmission policy comprising a restriction to only broadcast a content feed to a geographically limited area, wherein the transmission policy further comprises a bandwidth restriction and a time restriction, wherein the bandwidth restriction comprises a restriction to only broadcast the content feed on a particular frequency band; and block any content feeds from the content provider violating the transmission policy associated with the content provider.

10. A computer program product comprising the computer program according to claim 9 and a non-transitory computer readable medium on which the computer program is stored.

* * * * *